May 16, 1967 T. F. LAWRENCE ETAL 3,319,929
VIBRATION DAMPING MEANS

Filed Dec. 31, 1964 2 Sheets-Sheet 1

INVENTORS
THOMAS F. LAWRENCE
JACK R. MARTIN
BY
George R. Powers
ATTORNEY—

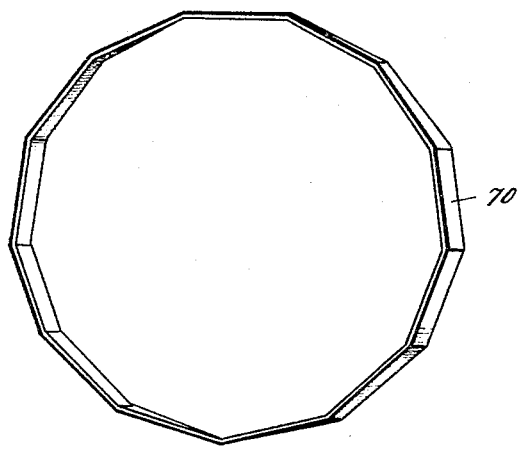
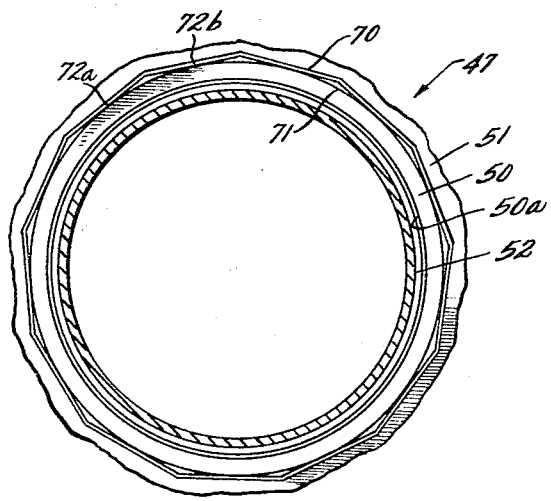
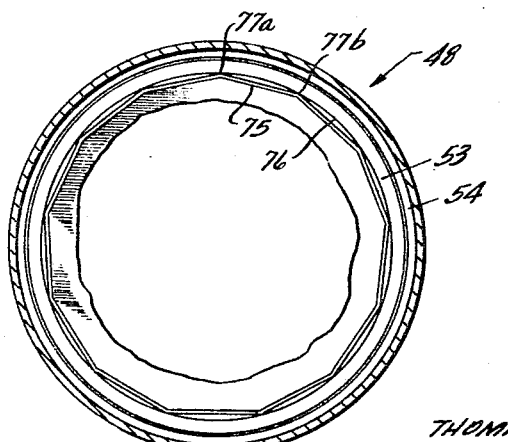

United States Patent Office 3,319,929
Patented May 16, 1967

3,319,929
VIBRATION DAMPING MEANS
Thomas Frederick Lawrence, Beverly, and Jack Reid Martin, Bedford, Mass., assignors to General Electric Company, a corporation of New York
Filed Dec. 31, 1964, Ser. No. 422,624
8 Claims. (Cl. 253—39)

This invention relates to improved and simplified means for damping vibrations and, more particularly, to such means for damping vibration in turbomachinery seals. The damping means of this invention is especially effective for damping modes of vibration characterized by diametral nodes.

A turbomachine, including a gas turbine engine, may be described broadly as comprising two major subassemblies, the first being a stationary assembly, the stator, and the second being a movable assembly, the rotor, supported by the stator. Portions of the stator and the rotor cooperate to form a passageway through which motive fluid may be directed. In order to attain satisfactory output and efficiency from the turbomachine, it is essential that the motive fluid flow through the passageway in the required manner without leaking from the passageway. To prevent undesired leakage, seals may be provided between the rotor and stator elements at locations where such leakage would otherwise be likely to occur. While these seals may take different forms in practice, nonrubbing seals, particularly labyrinth seals having interdigitated elements, are usually preferred in view of the high rotary speeds commonly attained during turbomachine operation.

It has been found in practice that the annular elements comprising the seals may be subjected to vibration during high speed turbomachine operation. This is an especially prevalent problem concerning the sationary seal component. While the causes of this vibration, as well as its nature, are not fully understood even by those highly skilled in the art, the best evidence available indicates that the excitation causing the vibration may be provided by one or more of the following: (1) rubbing contact between the seal elements, (2) fluctuating air pressure on the seal elements, and (3) resonance in the rotor. However caused, the vibration typically has a number of diametral nodes which travel about the annular seal member as a circumferential wave. Unless it is effectively damped, this vibration may cause fatigue failure of the stationary seal component. This fatigue failure commonly takes the form of radial cracking of the seal ring, but may take other undesired and destructive forms. As a result, efforts have been made in the past to provide suitable means for damping the destructive vibration. Unfortunately, however, relatively simple and inexpensive means used for this purpose have tended to be ineffective, while devices which have proved to be effective in damping the vibration are typically complicated, expensive, and much too heavy to be suitable for use in aircraft mounted turbomachines such as aircraft gas turbine engines.

It is therefore an object of this invention to provide simplified means for damping vibration in members subject to destructive vibration.

A further object of this invention is to provide for turbomachinery seals vibration damping means which is not only effective, but also relatively uncomplicated, lightweight, and inexpensive.

A still further object of this invention is to provide for turbomachinery seals vibration damping means for damping effectively modes of vibration characterized by diametral nodes.

Briefly stated, in carrying out the invention in one form, a member subject to vibration, the stationary component of an annular turbomachine seal in the illustrated embodiments, is provided with a cylindrical seat for receiving a novel damping ring in an interference fit. When viewed along its axis, the damping ring of this invention may be described as being formed in the shape of a polygon having an odd number of sides and a diameter which is either smaller or larger than the diameter of the cylindrical seat, its diameter being smaller where the seat is an external cylindrical surface and larger where the seat is an internal cylindrical surface. The diameter of the polygon ring is defined to be either the diameter of a circle inscribed in the polygon where the ring is mounted on an external seat or the diameter of a circle circumscribed about the polygon where the ring is mounted within an internal seat. In either situation, there are an odd number of engagement points between the ring and the seat, the number of points being equal to the number of sides on the ring. Since there are an odd number of engagement points uniformly spaced about the circumference of the seat, there are no diametrically opposed points. As a result, the polygon ring is extremely effective in damping vibration characterized by diametral nodes since energy is dissipated not only by flexing of the ring as in most prior art damping rings, but also by frictional rubbing between the ring and the seat at the engagement points which may be the major portion of the total damping.

While the invention is distinctly claimed and particularly pointed out in claims appended hereto, the invention will be better understood and appreciated, along with other objects and features thereof, by reference to the following detailed description when considered in connection with the accompanying drawing, in which:

FIG. 5 is a pictorial view of a polygon damping ring suitable for use on the stationary components of the seals of the engine illustrated by FIG. 1;

FIG. 6 is a view taken along line 6—6 of FIG. 1 illustrating a polygon ring of the type illustrated by FIG. 5 mounted on an external seat; and FIG. 7 is a view taken along line 7—7 of FIG. 1 illustrating a damping ring of the present invention mounted within an internal seat.

Figure 1:
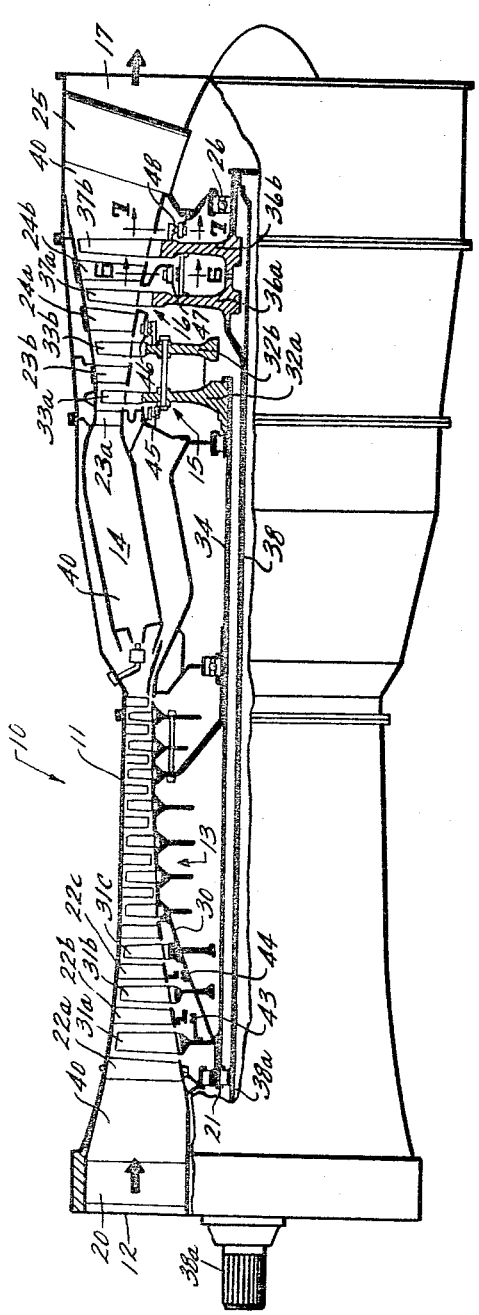
FIG. 1 is a sectional view of a gas turbine engine utilizing the damping means of this invention.

Referring first to FIG. 1, a gas turbine engine 10 of the "turboprop" type is illustrated, the engine 10 having a generally cylindrical casing 11 enclosing, in axial flow relationship, an annular inlet duct 12, a compressor 13, a combustor 14, a gas generator turbine 15, a power turbine 16, and an annular exhaust nozzle or duct 17. As mentioned previously in this specification, a turbomachine may be described broadly as comprising two major subassemblies, a "stator" and a "rotor," which cooperate to form a passageway through which motive fluid may flow. The gas turbine engine 10 illustrated by FIG. 1 may be viewed in this manner, its stator comprising the casing 11 and the other stationary structure including radial support struts 20 spanning the inlet duct 12 to provide rotor support means 21 at the front of the engine, a plurality of rows of radial compressor stator vanes 22a, 22b, 22c, etc., the structure of the combustor 14, nozzle guide vanes 23a, and 23b for the gas generator turbine 15, nozzle guide vanes 24a and 24b for the power turbine 16, and radial support struts 25 spanning the exhaust nozzle 17 to provide rotor suport means 26 at the aft end of the engine 10.

The rotor of the engine 10 comprises the structure rotatably mounted by the support means 21 and 26 and as such includes two rotor units, a gas generator rotor unit and a power turbine rotor unit. The gas generator rotor unit comprises a compressor drum 30 and a plurality of rows of compressor blades 31a, 31b, 31c, etc., mounted thereon, turbine rotor discs 32a and 32b having rows of turbine buckets 33a and 33b mounted thereon, and a hollow cylindrical shaft 34 connecting the drum 30 and the rotor discs 32a and 32b. The power turbine rotor unit comprises turbine rotor discs 36a and 36b having rows of turbine buckets 37a and 37b mounted thereon a shaft 38 coaxially mounted within the hollow cylindrical shaft 34 and extending from the rotor discs 36a and 36b through the engine to the front of the engine 10 where it terminates in a forward extension 38. Although not illustrated, it will be obvious to those skilled in the art that suitable loads such as aircraft propellers and helicopter rotors can be connected to forward extension 38a and thus be driven by the power turbine 16.

From FIG. 1 and the above description, it will be appreciated that the stator and rotor portions of the engine 10 cooperate to form an annular motive fluid passageway 40 extending the entire length of the engine, the passageway 40 including at opposite ends of the engine 10 the inlet and exhaust ducts 12 and 17, respectively. In the illustrated gas turbine engine, the motive fluid, which is initially air and then combustion products, is subjected to several processes as it flows through the passageway 40. It is first compressed to high pressure in the compressor 13 and then burned at substantially constant pressure to produce high temperature exhaust gases, which then drive the gas generator turbine 15 and the power turbine 16 where both the temperature and the pressure of the gases are reduced. To attain satisfactory power output and efficiency from the engine 10, it is essential that the maximum possible amount of net work be obtained from the motive fluid as it flows through the passageway 40. To achieve this objective, the motive fluid must flow the entire length of the passageway 40; if the motive fluid is allowed to leak out of the passageway 40 prior to reaching the exhaust duct 17, a certain amount of energy will be irretrievably lost, the result being a corresponding loss in output and efficiency.

While undesired leakage can occur at any number of locations, it has been found in practice that leakage of motive fluid is extremely likely to occur in the initial compressor stages and in the turbine area. It is therefore desirable to provide suitable seals at these locations. With reference to the compressor 13 of the engine 10, a labyrinth seal 43 is provided between the row of stator vanes 22b and the compressor drum 30 to prevent the higher pressure air on the downstream side of the vanes 22b from flowing around the inner ends of the vanes and re-entering the passageway 40 on the lower pressure upstream side. A similar seal 44 is located at the inner end of the stator vanes 22c, and similar sealing means 45, 46, and 47 are provided between the rows of nozzle guide vanes 23b, 24a, and 24b, respectively, and the associated rotor structure. A labyrinth seal 48 is also provided at the discharge end of the power turbine 16. As seal 43, the function of the seals 44–48 is to prevent flow of motive fluid from higher to lower pressure regions.

Referring now to FIGS. 1 and 6, the seal 47, which is similar to seals 43–46, will be described in greater detail. The seal 47 is comprised of two annular components, an outer stationary member 50 mounted on a frusto-conical member 51 extending inwardly from and supported by the row of nozzle guide vanes 24b and an inner movable member including annular teeth 52 carried by the rotor discs 36a and 36b. The stationary member 50 has an inner surface 50a of suitable material such as expanded honeycomb for cooperating with the teeth 52 to form a tortuous labyrinth path which, when the rotor discs 36a and 36b are driven at high rotary speed, is effective to prevent leakage. As shown by FIGS. 1 and 7, the seal 48 is similar to the seals 43–47, except that the relative positions of its stationary member 53 and movable member 54 are reversed.

As discussed at a previous point in this specification, seals such as the seals 43–48 are typically subjected to vibration during turbomachine operation. Unless it is effectively damped, this vibration may cause radial cracking in the stationary seal components and other deleterious effects. In accordance with the present invention, novel means is provided for effectively damping this vibration. Before proceeding with a description of the damping means of this invention, it will be well to discuss briefly the nature of the vibration typically encountered in turbomachine seals.

Figure 2:
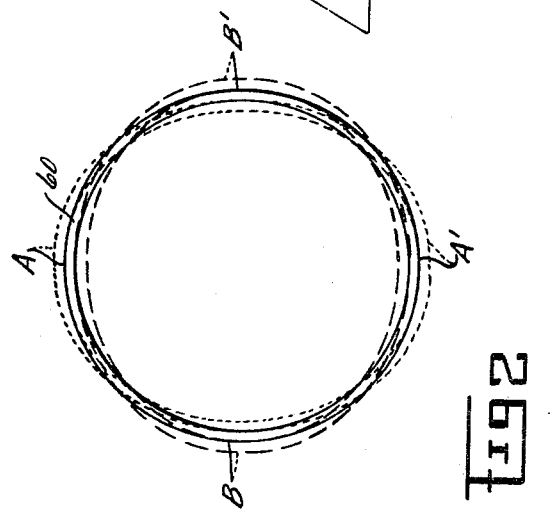
FIG. 2 is a view of an annular member subject to vibration characterized by diametral nodes in which the effect of the vibration on the member is illustrated.

With reference to FIG. 2, an annular member 60 subject to vibration is illustrated schematically, this member 60 being analogous to the stationary components of the seals 43–48 in the manner in which it vibrates. At rest, the member 60 has a circular shape as illustrated by the solid lines of FIG. 2. If the member were to vibrate in the manner of the stationary seal components during turbomachine operation, diametrically opposed points on the member would move in opposite directions. For example, the member 60 has two illustrated pairs of diametral points, A–A' and B–B'. Assuming that the member 60 is excited so as to vibrate in a mode characterized by diametral nodes, one pair of points will first move radially outward and then inward while the pair of points displaced 90 degrees from the first pair will first move radially inward and then outward. This simplified form of vibration is illustrated by the broken lines of FIG. 2. As a practical matter, actual members such as stationary seal members are typically subject to more complicated modes of vibration in that a number of diametral nodes are present and these nodes tend to move about the periphery of the member such that the actual movement of any particular point with time takes on the characteristics of a sinusoidal wave. For the purpose of analysis, however, the simplified mode of vibration illustrated by FIG. 2 is adequate since the primary characteristic is identical to that present in the more complicated modes of vibration encountered in actual practice. That is, diametrically opposed points always move together and in opposite directions.

Figure 3:
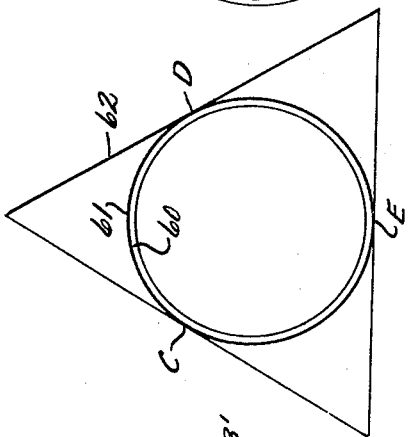
FIG. 3 is a schematic view showing a damping ring formed in accordance with the present invention mounted on the outer surface of the annular member of FIG. 2.

With the basic nature of the vibration understood, attention is now directed to FIG. 3 where a damping ring 62 formed in accordance with the present invention is mounted on the cylindrical outer surface 61 of the annular member 60 with an interference fit. The damping ring 62 has three regular sides and may be described as being a polygon ring, "polygon" meaning a closed geometric figure having three or more sides of substantially uniform length. Since the sides of the polygon ring 62 are of substantially uniform length, the ring 62 engages the outer surface 61 of the member 60 at the midpoints of the sides of the damping ring 62, these points of contact being designated C, D, and E. Also, since there are an odd number of engagement points equally spaced about the periphery of the member 60, it will be apparent that no two points are located on a common diameter. Consequently, with the member 60 vibrating with diametral nodes, there must be sliding movement between the outer surface 61 and the ring 62 at at least two of the engagement points at all times since no two of the engagement points are moving in unison. In this manner, a certain amount of the energy is dissipated in the form of heat. At the same time, additional energy is dissipated in flexing the damping ring 62 since the ring 62 responds to the inward and outward movement of the engagement points.

When mounted on an external seal as in FIG. 3, the diameter of the polygon ring 62 must be less than the diameter of the annular member 60 in order to provide the desired interference fit, the "diameter" of the ring 62 in this situation being defined to be the diameter of a circle inscribed in the ring when the ring is unstressed. The difference between the two diameters, or the amount of interference, can be substantial without causing undue difficulty during assembly since the sides of the ring are relatively flexible in the radial direction. In practice, the actual difference between the two diameters will depend on a number of factors, such as the amount of heat generation desired, the allowable stress levels, and the actual flexibility of the material comprising the ring, etc.

Figure 4:
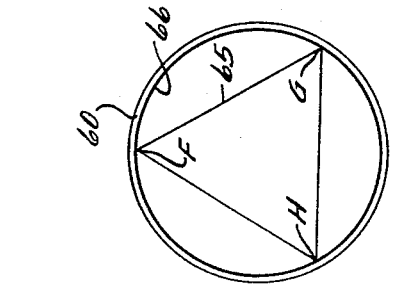
FIG. 4 is a schematic view showing a damping ring formed in accordance with the present invention mounted on the inner surface of the annular member of FIG. 2.

As illustrated by FIG. 4, a polygon ring 65 having an odd number of sides can also be mounted on the inner surface 66 of the member 60, the vertices F. G. and H being the engagement points at which rubbing, and consequently heat dissipation occurs. In this situation, the diameter of the ring 65 must be greater than the diameter of the inner surface 66 of the member 60. When mounted on an internal seat such as the surface 66, the "diameter" of the ring is defined to be the diameter of a circle circumscribed about the ring when the ring is unstressed. It will immediately occur to those skilled in the art that the ring 65 must, as the ring 62, be radially flexible in order to facilitate assembly. This radial flexibility must occur, however, at the vertices of the ring rather than at the midpoints of the sides. A ring thus mounted on an internal seat is inherently less flexible than one mounted on an external seat since the polygon sides are placed in compression rather than being deflected by means of a lateral force. If it is found in practice that the limited amount of flexibility readily attainable from a polygon ring of the type illustrated is insufficient for easy assembly and effective operation, the ring may be modified in various ways to promote radial flexibility at the vertices. For example, the sides may be made slightly curved rather than straight so as to promote gradual bending under load instead of sudden buckling. Similarly, the sides may be provided with corrugated or "wiggle" sections to allow relatively free compression of the sides along their length. For the purposes of this description, polygon damping rings mounted on internal seats will be assumed to have straight sides of uniform length; however, if necessary in a particular application of the invention, the ring may be modified as described above. Other ways to modify the ring will be equally obvious to those skilled in the art.

For a practical application such as in the engine 10 of FIG. 1, a polygon ring having only three sides may not be entirely suitable since it takes up substantially greater space than the member upon which it is mounted. By increasing the number of sides, the damping ring can be made to approach a circular shape and thus take up less space. Accordingly, in one application, it was found that a ring having thirteen sides was ideal, this ring 70 being illustrated diagrammatically by FIG. 5 and shown by FIG. 6 mounted on an external cylindrical seat 71 of the stationary seal member 50 of seal 47. The polygon ring 70 contacts the seat 71 at an odd number of engagement points 72a, 72b, etc., the number being equal to the number of sides of the polygon ring. Since no two of the points are diametrically opposed, it will be evident that vibration in the stationary member 50 is effectively damped by energy being dissipated by both flexing of the ring and rubbing at the engagement points.

In a similar manner, a polygon ring 75 having an odd number of sides is shown by FIG. 7 mounted on an internal cylindrical seat 76 on the stationary member 53 of the seal 48, the interference contact occurring at the non-diametral vertices 77a, 77b, etc., of the polygon ring 75. For both internally and externally mounted polygon rings, the precise number of sides and other physical characteristics of the ring used will depend upon a number of factors. For example, the thickness of the damping ring will depend in large measure on the flexibility desired. It will also be obvious to those skilled in the art that the tolerances to which the ring is manufactured must become finer as the number of sides increase. In addition, the amount of heat dissipation desired can be useful in determining the number of engagement points and the amount of interference, i.e., the normal force exerted at each of the engagement points.

With a polygon ring formed in accordance with the present invention mounted on its cylindrical seat as described above, the pressure exerted between the ring and the seat at the engagement points is generally sufficient to maintain the ring in its proper position during turbomachine operation. If it is found in practice, however, that the vibration and the rubbing which results at the engagement points cause the ring to creep, suitable means may be provided to retain the ring in its normal position. It is, of course, essential that the retaining means chosen not connect the ring and its seal so tightly that the desired rubbing action cannot occur at the engagement points. As an example, a radial pin extending through both the seat and the ring will prevent excessive movement of the ring both axially and circumferentially, the pin having sufficient clearance relative to one or both of the members to permit rubbing and, consequently, heat dissipation.

From the foregoing, it will be appreciated that the novel polygon damping ring of this invention is effective in damping modes of vibration characterized by diametral nodes. In addition to being effective, the polygon damping ring is relatively uncomplicated, light weight, and inexpensive. While it has been illustrated and described as a damping means for stationary seal components in gas turbine engines, it will be appreciated that it may be used on movable seal components and in other environments where vibration occurs. As an example, a polygon ring of this invention may be used to damp vibrations in a cylindrical brake drum.

While particular embodiments of the invention have been shown and described, it will be understood that various changes and modifications may be made without departing from the spirit and scope of the invention, and it is intended to cover all such changes and modifications by the appended claims.

What is claimed as new and is desired to secure by Letters Patent of the United States is:

1. In a turbomachine having stator and rotor members cooperating to form a motive fluid passage therethrough, a seal assembly to prevent leakage of motive fluid from said passage, said seal assembly comprising:
   a first seal member carried by said stator member,
   a second seal member carried by said rotor member for rotation therewith,
   said first and second seal members cooperating to form therebetween a seal for preventing leakage of motive fluid from said passage,
   said first member having a substantially cylindrical surface thereon,
   and a polygon ring having an odd number of discrete sides engaging said cylindrical surface at a plurality of points none of which are diametrically opposed, the number of contact points being equal to the number of sides of said polygon ring.

2. Means for damping vibrations in a member subject to destructive vibration, said means comprising:
   a cylindrical seat on the member subject to vibrations,
   and a polygon ring having an odd number of discrete sides mounted in an interference fit with said cylindrical seat,
   the number of engagement points between said polygon ring and said cylindrical seat being equal to the number of sides of said ring, and none of said points are diametrically opposed.

3. Means for damping vibrations in a member subject to destructive vibration, said means comprising:
   a cylindrical external seat on the member subject to vibration,
   and a polygon ring having an odd number of discrete sides for mounting on said cylindrical seat in surrounding relation thereto, the diameter of a circle inscribed within said polygon ring being less than the diameter of said cylindrical seat such that an interference fit exists when said polygon ring is mounted on said cylindrical seat,
the number of engagement points between said polygon ring and said cylindrical seat being equal to the number of sides of said ring and being located at radially flexible points, none of which are diametrically opposed.

4. Means for damping vibrations in a member subject to destructive vibration, said means comprising:
a cylindrical internal seat on the member subject to vibrations,
and a polygon ring having an odd number of discrete sides for mounting within said cylindrical seat,
the diameter of a circle circumscribed about said polygon ring being greater than the diameter of said cylindrical seat such that an interference fit exists when said polygon ring is mounted within said cylindrical seat,
the number of engagement points between said polygon ring and said cylindrical seat being equal to the number of sides of said ring and being located at radially flexible points, none of which are diametrically opposed.

5. In a turbomachine having an annular seal member, means for damping vibration in said seal member comprising:
a cylindrical seat on said seal member,
and a relatively thin polygon ring having an odd number of discrete sides mounted in an interference fit with said cylindrical seat,
the number of engagement points between said polygon ring and said cylindrical seat being equal to the number of sides of said ring, said points being located at intervals none of which are diametrically opposed.

6. In a turbomachine rotor assembly having a rotor member mounted for rotation about an axis and a stator member adjacent said rotor member, a sealing assembly including vibration damping means comprising:
a first annular seal member carried by said stator member, the axis of said first annular seal member being coaxial with the rotor axis,
a second annular seal member carried by said rotor member, said second annular member being coaxially mounted in axially aligned relationship with said first annular member,
a first cylindrical seal surface on said first seal member and a complementary second cylindrical seal surface on said second seal member,
said first and second seal surfaces being in facing relationship and cooperating to form therebetween a seal,
a cylindrical seat on said first seal member,
and a relatively thin polygon ring having an odd number of discrete sides mounted in an interference fit with said seal seat,
the number of engagement points between said polygon ring and said cylindrical seat being equal to the number of sides of said ring.

7. In a turbomachine rotor assembly having a rotor member mounted for rotation about an axis and a stator member adjacent said rotor member, a sealing assembly including vibration damping means comprising:
a first annular seal member carried by said stator member, the axis of said first annular seal member being coaxial with the rotor axis,
a second annular seal member carried by said rotor member, said second annular seal member being coaxially mounted within said first seal member in axially aligned relation thereto,
an internal cylindrical seal surface on said first seal member and a complementary external cylindrical seal surface on said second seal member,
said internal and external seal surfaces cooperating to form therebetween a seal,
an external cylindrical seat on said first seal member,
and a relatively thin polygon ring having an odd number of discrete sides mounted in an interference fit with said seat in surrounding relation thereto,
the number of engagement points between said polygon ring and said cylindrical seat being equal to the number of sides of said ring and being located at substantially the midpoints of the sides of said ring.

8. In a turbomachine rotor assembly having a rotor member mounted for rotation about an axis and a stator member adjacent said rotor member, a sealing assembly including vibration damping means comprising:
a first annular seal member carried by said stator member, the axis of said first annular seal member being coaxial with the rotor axis,
a second annular seal member carried by said rotor member, said second annular seal member coaxially surrounding said first seal member in axially aligned relation thereto,
an external cylindrical seal surface on said first seal member and a complementary internal cylindrical seal surface on said second seal member,
said external and internal seal surfaces cooperating to form therebetween a seal,
an internal cylindrical seat on said first seal member,
and a relatively thin polygon ring having an odd number of discrete sides mounted in an interference fit within said seat,
the number of engagement points between said polygon ring and said cylindrical seat being equal to the number of sides of said ring and being located at the vertices of said ring.

References Cited by the Examiner
UNITED STATES PATENTS

| | | | |
|---|---|---|---|
| 3,062,072 | 11/1962 | Hirst | 74—574 |
| 3,174,360 | 3/1965 | Katzenberger | 74—574 |

FOREIGN PATENTS

| | | |
|---|---|---|
| 541,248 | 3/1956 | Italy. |

References Cited by the Applicant
UNITED STATES PATENTS

| | | |
|---|---|---|
| 2,664,763 | 1/1954 | Sarazin. |
| 2,941,631 | 6/1960 | Fosberry et al. |
| 2,977,819 | 4/1961 | Haushalter. |
| 3,041,889 | 7/1962 | Haushalter. |
| 3,057,220 | 10/1962 | Parr. |

MARTIN P. SCHWADRON, *Primary Examiner.*

EVERETTE A. POWELL JR., *Examiner.*